(12) United States Patent
Gupta

(10) Patent No.: US 11,551,197 B2
(45) Date of Patent: Jan. 10, 2023

(54) SMART-GLASSES BASED CONTACTLESS AUTOMATED TELLER MACHINE ("ATM") TRANSACTION PROCESSING

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 56 days.

(21) Appl. No.: 17/140,008

(22) Filed: Jan. 1, 2021

(65) Prior Publication Data

US 2022/0215375 A1    Jul. 7, 2022

(51) Int. Cl.
| | | |
|---|---|---|
| *G06Q 20/32* | (2012.01) | |
| *G06Q 20/40* | (2012.01) | |
| *G06F 3/01* | (2006.01) | |
| *G06F 21/31* | (2013.01) | |
| *G02B 27/01* | (2006.01) | |
| *G06Q 20/10* | (2012.01) | |

(52) U.S. Cl.
CPC ..... *G06Q 20/3223* (2013.01); *G02B 27/0172* (2013.01); *G06F 3/011* (2013.01); *G06F 3/017* (2013.01); *G06F 21/316* (2013.01); *G06Q 20/1085* (2013.01); *G06Q 20/3224* (2013.01); *G06Q 20/3278* (2013.01); *G06Q 20/4014* (2013.01); *G02B 2027/0178* (2013.01)

(58) Field of Classification Search
None
See application file for complete search history.

(56) References Cited

U.S. PATENT DOCUMENTS 7,967,193 B1* 6/2011 McGinley ............... G06F 21/57
235/379
11,354,631 B1* 6/2022 Hill ....................... H04W 4/021
(Continued)

OTHER PUBLICATIONS

"Krysztof Jackowski, Augmented Reality on Mobile with an App Tutorial for Android, Nov. 6, 2019, 9-15" (Year: 2019).*
(Continued)

*Primary Examiner* — Kito R Robinson
*Assistant Examiner* — Toan Duc Bui
(74) *Attorney, Agent, or Firm* — Weiss & Arons LLP; Michael A. Springs, Esq.

(57) ABSTRACT

A method for touchless communication between an ATM and a smartglasses device worn by a user is provided. The method may be executed at the smartglasses device. The method may include identifying a current global positioning system ("GPS") location of the ATM. The method may include communicating with an external database to determine an ATM identifier associated with the ATM. The ATM identifier may include ATM communication data. The method may include transmitting an external smartglasses identifier to the ATM via the ATM communication data. The method may include receiving a communication from the ATM. The communication may include an interactive payment interface. The method may include displaying the interactive payment interface on the smartglasses. The method may include receiving one or more commands from the user. The method may include transmitting the one or more commands from the smartglasses to the ATM.

10 Claims, 5 Drawing Sheets

(56) References Cited

U.S. PATENT DOCUMENTS

| | | | | |
|---|---|---|---|---|
| 11,354,632 | B1* | 6/2022 | Hill | G06Q 20/4037 |
| 2014/0146178 | A1* | 5/2014 | Kim | G01S 17/86 |
| | | | | 348/159 |
| 2016/0364008 | A1* | 12/2016 | Chun | G02B 27/01 |
| 2019/0286805 | A1 | 9/2019 | Law et al. | |
| 2019/0298173 | A1* | 10/2019 | Lawrence | A61B 5/0024 |
| 2021/0279700 | A1* | 9/2021 | Simpson | H04W 12/63 |
| 2021/0357897 | A1* | 11/2021 | Phillips | G06Q 20/3223 |
| 2022/0083985 | A1* | 3/2022 | Negulescu | G06Q 10/1091 |
| 2022/0114327 | A1* | 4/2022 | Faaborg | G06F 40/53 |

OTHER PUBLICATIONS

Max Freeman-Mills, "Apple AR Glasses Could Land In 2022-According to New Report," http://www.wareable.com/ar/apple-augmented-reality-ar-smartglasses-3501, Wearable Ltd., Nov. 12, 2019.

"Bluetooth," https://en.wikipedia.org/wiki/Bluetooth, Widimedia Foundation, Inc., Oct. 14, 2020.

"Connectivity," https://developers.google.com/glass-enterprise/guides/connectivity, Google Developers, Glass Enterprise Edition 2, Jul. 27, 2020.

"Design Guidelines," https://developers.google.com/glass-enterprise/guides/design-guidelines, Glass Enterprise Edition 2, Google Developers, May 21, 2019.

"Development Tips," https://developers.google.com/glass-enterprise/guides/development-tips, Glass Enterprise Edition 2, Google Developers, Aug. 12, 2020.

"Get Started," https://developers.google.com/glass-enterprise/guides/get-started, Glass Enterprise Edition 2, Google Developers, Aug. 12, 2020.

"Inputs and Sensors," https://developers.google.com/glass-enterprise/guides/inputs-sensors, Google Developers, Glass Enterprise Edition 2, Jul. 29, 2020.

"Smattglasses," https://en.wikipedia.org/wiki/Smartglasses, Wikimedia Foundation, Inc., Oct. 1, 2020.

"Tech Specs," https://www.google.com/glass/tech-specs/, Glass Enterprise Edition 2, Retrieved on Oct. 19, 2020.

Michael Sawh, "The Best AR Glasses and Smartglasses 2020: Snap, Vuzix and More," https://www.wareable.com/ar/the-best-smartglasses-google-has-and-the-rest, Wareable Ltd., Jul. 1, 2020.

"User Interface," https://developers.google.com/glass-enterprise/guide/user-interface, Google Developers, Glass Enterprise Edition 2, Feb. 27, 2020.

"Vue Lite Cygnus," https://vueglasses.com/collections/eyeglasses-vue-life-cygnus-eyeglasses?variant=35797226291363, Vigo Technologies Inc., Retrieved on Oct. 19, 2020.

"Vue: Your Everyday Smart Glasses," https://www.kickstarter.com/projects/vue/vue-your-everyday-smart-glasses, Kickstarter, PBC, Retrieved on Oct. 19, 2020.

* cited by examiner

SMART-GLASSES BASED CONTACTLESS AUTOMATED TELLER MACHINE ("ATM") TRANSACTION PROCESSING

FIELD OF TECHNOLOGY

Aspects of the disclosure relate to automated teller machines ("ATMs"). Specifically, this disclosure relates to processing transactions at ATMs.

BACKGROUND OF THE DISCLOSURE

ATMs are computerized electronic machines configured to perform basic banking functions. Conventional ATMs request physical input and/or physical contact of a banking card or computing device to initiate a transaction. ATMs typically include physical buttons, both dynamic, such as for example on a touch screen, and static, such as for example on a pin pad, to receive user selections. The user may physically depress or touch the buttons to submit a user selection.

There may be various shortcomings associated with physically touching an ATM. One shortcoming may be a security deficiency. A person with malicious intent may place a skimming device on top of an ATM pin pad and/or buttons. A skimming device may be a device that is overlayed on a secure data entry device, such as an ATM pin pad. The skimming device may retrieve confidential information that is tactilely entered onto the secure data entry device. Exemplary confidential information retrieved from a skimming device includes personal identification numbers and biometric fingerprint data.

Recently, it has become increasingly desirable to communicate with public-facing electronic devices using contactless technology. Therefore, the physical contact requirement of ATMs is another shortcoming linked to current ATM technology.

Smartglasses have become more common in recent years. For the purposes of this disclosure, smartglasses may be understood to mean wearable glasses that include one or more internal processors.

It would be desirable for a system that utilizes input received from smartglasses to authenticate a user, preferably when the user is wearing the smartglasses, at an ATM. It would be further desirable for the system to enable the ATM to receive user selections input via the smartglasses. It would be yet further desirable for the system to enable contactless transaction communications between the smartglasses and the ATM.

SUMMARY OF THE DISCLOSURE

A system, or platform, for contactless, or touchless, communication between an ATM and a smartglasses device is provided.

The system may include a smartglasses device. For the purposes of this disclosure, smartglasses may be understood to mean wearable glasses that include one or more internal processors. The one or more internal processors may include one or more microprocessors.

In addition to the processors, smartglasses may also include hardware components associated with conventional glasses. Such components may include a frame and lenses.

One or more software modules may execute on the processors. The one or more software modules may be stored in a memory located within the smartglasses. The one or more software modules may, in the alternative, be referred to as applications. The applications may enable the smartglasses to execute various tasks.

In addition to software modules, smartglasses may also include a display. In one embodiment, the smartglasses display may be physically configured to add data alongside what the wearer sees through the lenses. In some embodiments, the smartglasses display may display data as an at least partially transparent overlay on top the lenses. As such, the user may view, through the overlay, the physical objects that are normally seen through lenses. Such a smartglasses display may be known as an augmented realty smartglasses display.

Another component of smartglasses may include the ability for smartglasses to modify its optical properties, such as tint and prescription of the lenses, at any given time. Smartglasses may change optical properties of the lenses by executing one or more software modules on the internal processors.

Smartglasses may also include one or more communication transceivers. The communication transceivers may be operable to communicate with external processors. The external processors may be included in a mobile device or any other computing device.

The smartglasses device may include a contactless communication module. The contactless communication module may operate on the smartglasses processor. The contactless communication module may initiate communication with an ATM.

The system may include an ATM. The ATM may include various components, such as a card reader, a receipt printer, a cash dispenser, a check reader, a cash receiver, a cash recycler, a display and/or a touchscreen, a pin pad, a transceiver and any other suitable components. The ATM components may enable the ATM to perform various banking functions.

The display included on the ATM may present information to the user. The display may also include one or more dynamic and/or static user selectable buttons.

The contactless communication module may include a smartglasses application. The smartglasses application may be operable to scan a predetermined vicinity for an ATM. The smartglasses application may scan the predetermined vicinity for the ATM when the smartglasses application is set to a discoverable mode.

Upon locating the ATM, the smartglasses application may capture a current geographic location of the ATM. Upon locating the ATM, the smartglasses application may also capture an entity product associated with the ATM. The smartglasses application may transmit the captured current geographic location and the captured entity product to an external database.

The smartglasses application may receive an ATM IOT identifier from the external database. The ATM IOT identifier may include ATM communication data. The ATM communication may include a short-range wireless interconnection 48-bit identifier. The ATM communication data may also include a Bluetooth® identifier. The smartglasses application may ping the ATM using the ATM IOT identifier. The ping may include the smartglasses IOT identifier.

The ATM may be configured to communicate with the smartglasses module. As such, the ATM may receive the ping from the smartglasses module. In response to the ping, the ATM may generate a request to authenticate a user of the smartglasses. The smartglasses module may receive the request to authenticate the user of the smartglasses.

The smartglasses module may authenticate the user of the smartglasses. The authentication may be executed at an authorization controller module included in the smartglasses. The authorization controller module may authenticate the user based on a group of detected user behavioral characteristics. The group of detected user behavioral characteristics may include gait, speed, voice detection, head movements and body movements.

Upon successful authentication of the user at the smartglasses, the smartglasses module may transmit a responsive authentication communication to the ATM. The ATM may authenticate the user.

In some embodiments, the ATM may authenticate the user by transmitting the received responsive authentication communication to an external authenticator. The ATM may receive the authenticated signal from the external authenticator.

Once the ATM authenticates the user, the ATM may transmit a smartglasses operating system-based interactive payment interface to the smartglasses module. Upon receipt of the smartglasses operating system-based interactive payment interface, the smartglasses module may display the smartglasses operating system-based interactive payment interface on a display included in the smartglasses.

The interactive payment interface may also be referred to as a screen operable to be displayed on a smartglasses device. The screen may include selectable options. The selectable options may be selected by hand gestures.

The ATM may also display an ATM operating system-based interactive payment interface on an ATM display. The ATM operating system-based interactive payment interface may replicate the smartglasses operating system-based interactive payment interface on the ATM display. As such, the ATM operating system-based interactive payment interface and the smartglasses operating system-based interactive payment interface appear to the user to be identical. However, the ATM operating system-based interactive payment interface may accept touch input and the smartglasses operating system-based interactive payment interface may accept hand gesture inputs.

The smartglasses module may receive a hand gesture-based command. The hand gesture-based command may be received from the user. The hand gesture-based command may be a swipe, tap or any other suitable command.

The smartglasses module may translate the at least one hand gesture-based command into an ATM-readable command. The smartglasses module may transmit the ATM-readable command to the ATM. The ATM may receive the ATM-readable command and process the ATM-readable command. The ATM may identify a response to the ATM-readable command. The ATM may transmit the response to the smartglasses module.

The smartglasses module may receive the response from the ATM. The smartglasses modules may display the received response on the display included in the smartglasses.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
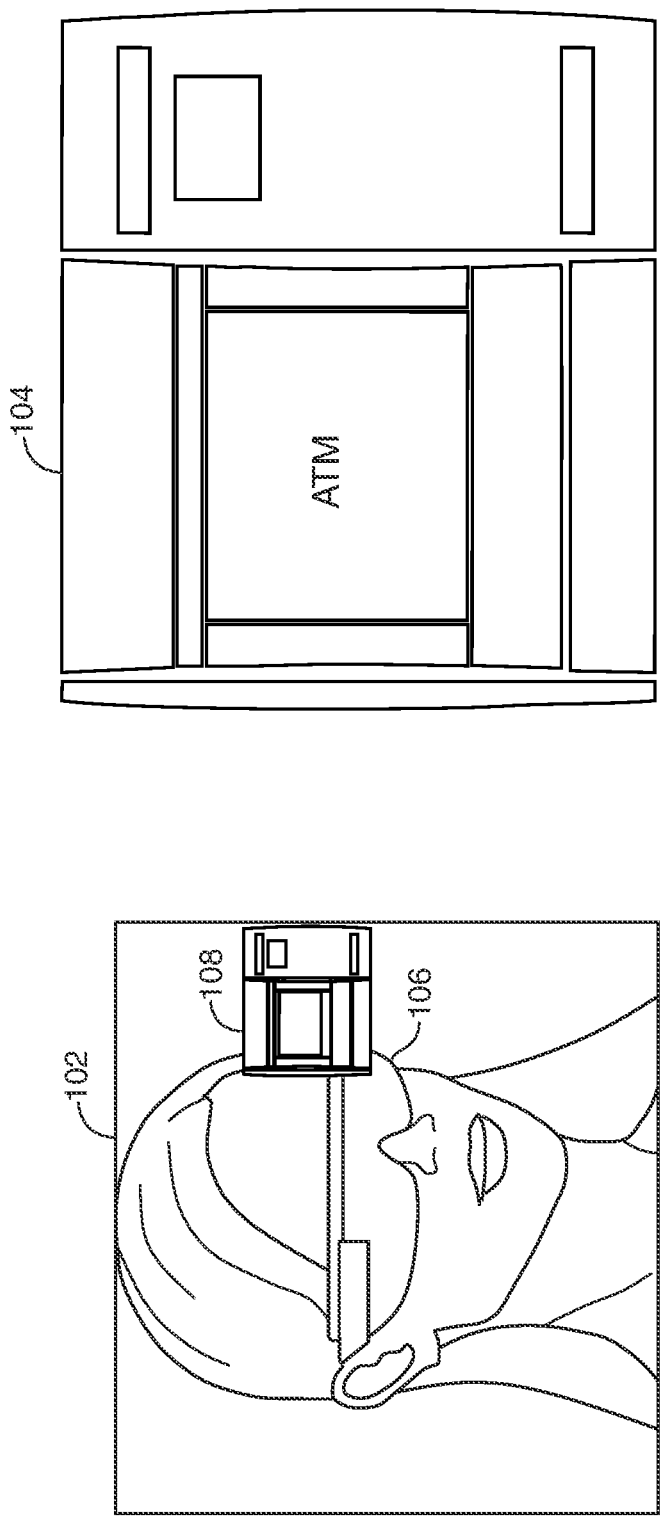
FIG. 1 shows an illustrative diagram in accordance with principles of the disclosure.

A system for establishing and maintaining communication between a smartglasses operating system and an automated teller machine ("ATM") operating system is provided. The system may include an ATM application executing on an ATM. The system may also include a smartglasses application executing on a smartglasses.

The smartglasses application may include an entity product scanner. The entity product scanner may be operable to identify an entity associated with the ATM.

The smartglasses application may include an ATM communication module. The ATM communication module may be operable to communicate with the ATM application. The communication between the ATM communication module and the ATM application may be based on the entity identified by the entity product scanner.

The smartglasses application may also include a user information controller. The user information controller may be operable to interface with an external database associated with the ATM. The user information controller may also be operable to maintain user account data in a smartglasses-based database.

The smartglasses application may also include an authorization controller. The authorization controller may be operable to authenticate a user of the smartglasses. The authorization controller may be operable to transmit authentication data to the ATM application. The authorization controller may be operable to receive an authorization response from the ATM application.

The smartglasses application may also include a hand gesture controller. The hand gesture controller may be operable to receive hand gesture-based command from the user of the smartglasses.

The smartglasses application may also include an interactive payment interface. The interactive payment interface may be displayable on a display of the smartglasses. The interactive payment interface may be operable to receive user selections via the hand gesture controller.

The smartglasses application may also include a front façade module. The front façade module may be operable to interface between the entity product scanner, the ATM communication module, the user information controller, the authorization controller, the hand gesture controller and the interactive payment interface.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. In segment 102, a user is shown wearing smartglasses 106. Smartglasses 106 may include one or more microprocessors, one or more displays, one or more cameras for capturing photographs and/or videos, one or more audio input devices, one or more audio output devices and/or one or more wired and/or wireless communication modules (e.g. Bluetooth®, Beacon®). The display may display information alongside what the user sees through the lenses. View 108 shows what the user is currently viewing on the display.

The communication module, included in smartglasses 106, may include multiple modes. The modes may include discoverable mode and non-discoverable mode. In a discoverable mode, the smartglasses may be actively searching for devices. In a non-discoverable mode, the smartglasses may not be actively searching for devices.

Smartglasses 106 may be set to discoverable mode. As such, smartglasses 106 may "discover" ATMs in the vicinity. A vicinity may be determined by a predetermined radius surrounding the ATM.

Smartglasses 106 may discover ATM 104. Smartglasses 106 may send a communication to ATM 104. The communication may be a pairing communication. The pairing communication may be authorized by ATM 104. Upon authorization, the pairing communication may link smartglasses 106 to ATM 104. As such, smartglasses 106 may be identified as the initiator in the communications between the ATM 104 and smartglasses 106.

In some embodiments, ATM 104 may discover smartglasses 106. In such embodiments, ATM 104 may initiate communication with smartglasses 106. ATM 104 may transmit a pairing communication to smartglasses 106. As such, smartglasses 106 may be identified as the initiator in the communications between ATM 104 and smartglasses 106. It should be appreciated, that a communication participant may be identified as the initiator at the outset of a communication. However, during the communication, the communication participant may act as both initiator and recipient during the communication.

Figure 2:
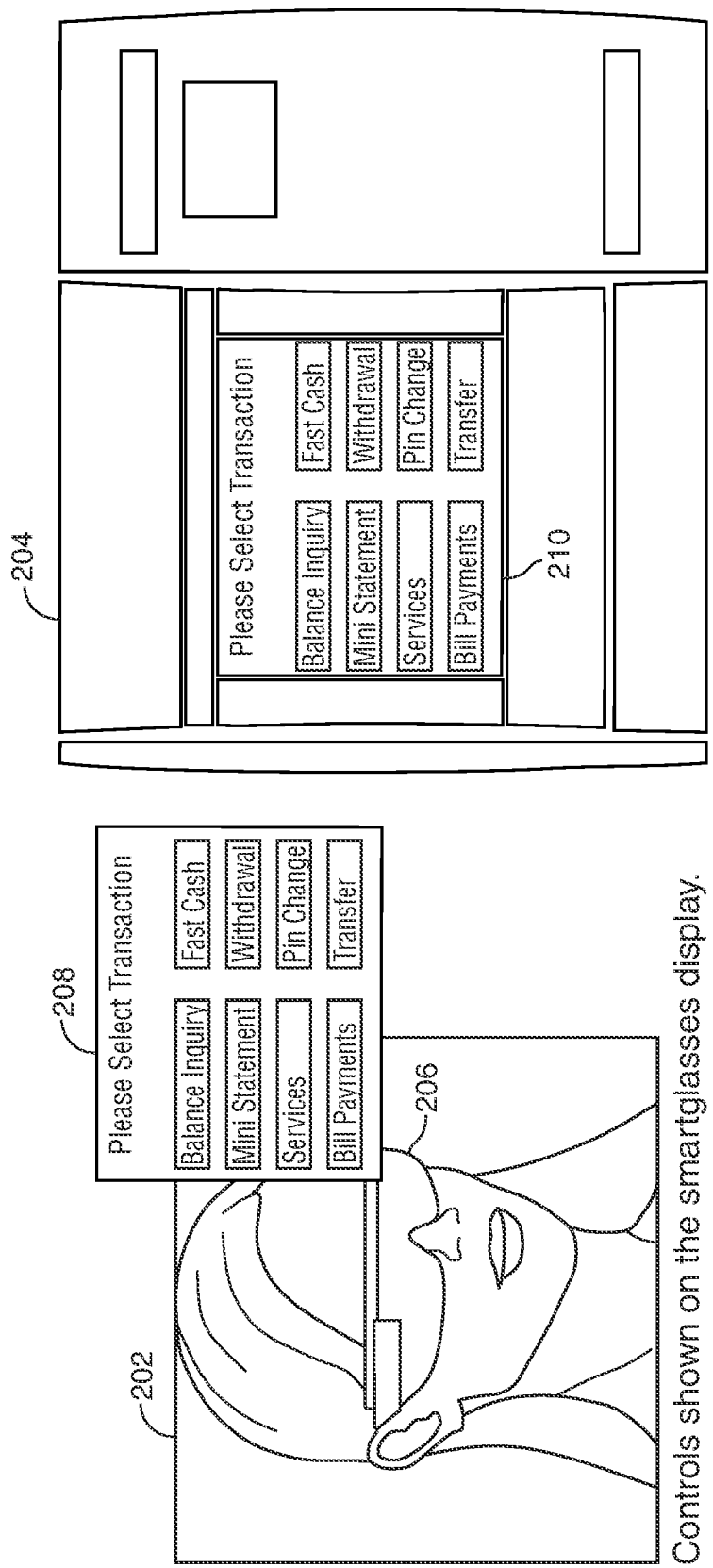
FIG. 2 shows another illustrative diagram in accordance with principles of the disclosure.

FIG. 2 shows an illustrative diagram. In segment 202, a user wearing smartglasses 206 may be in the middle of communication with ATM 204. The communication may have been authenticated, as discussed above.

During the communication, ATM 204 may display interactive graphical user interface ("GUI") 210. Interactive GUI 210 may be displayed on a display included on ATM 204. Additionally, ATM 204 may transmit GUI 210 to smartglasses 206. Smartglasses 206 may display a smartglasses-version of interactive GUI 210 on the display included on smartglasses 206. The smartglasses-version of interactive GUI may be displayed as interactive GUI 208. It should be appreciated that, although the optics of interactive GUI 208 and interactive GUI 210 may be similar, the software code that is used to power the two GUIs may be different. For example, GUI 210 may be structured to receive button-based inputs, while GUI 208 may be structured to receive gesture-based inputs. Additionally, ATMs may run operating systems specific to ATMs, while smartglasses may run operating systems specific to smartglasses.

Smartglasses 206 may be operable to receive commands from a user. The commands may be received in different ways. For example, the commands may be received from the user via touch gestures to one or more dynamic or static buttons on smartglasses 206. The commands may also be received from the user via touch gestures to one or more portions of the frames of smartglasses 206. Touch gestures may include swiping, tapping and squeezing. Touch gestures may also include a pattern of any of the above-mentioned gestures. The commands may also be received from air-based hand and/or body gestures. Air-based hand and/or body gestures may be performed by the user's hand or body without specifically touching the smartglasses. Various sensors, such as an accelerometer, gyroscope and touch pad may sense the hand and/or air gestures. Upon sensing the hand and/or air gestures, the sensor(s) and/or associated processors may translate the hand and/or air gestures into commands. The commands may be based on a command structure received from an external processor. The command structure may be received from the ATM. The command structure may be a payment structure. Smartglasses 106 may transmit the identified commands to the ATM.

Figure 3A:
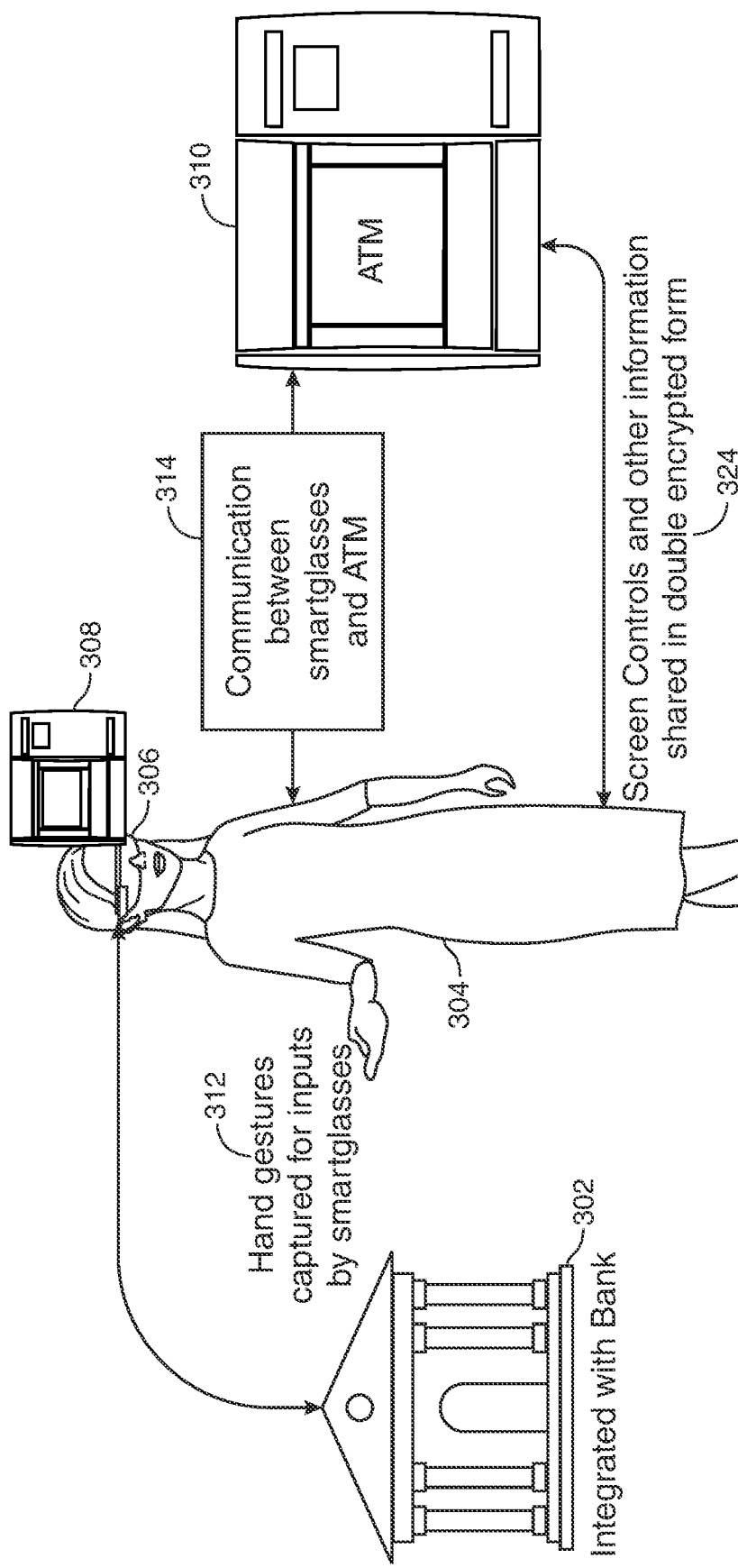
FIGS. 3A and 3B show yet another illustrative diagram in accordance with principles of the disclosure.
Figure 3B:
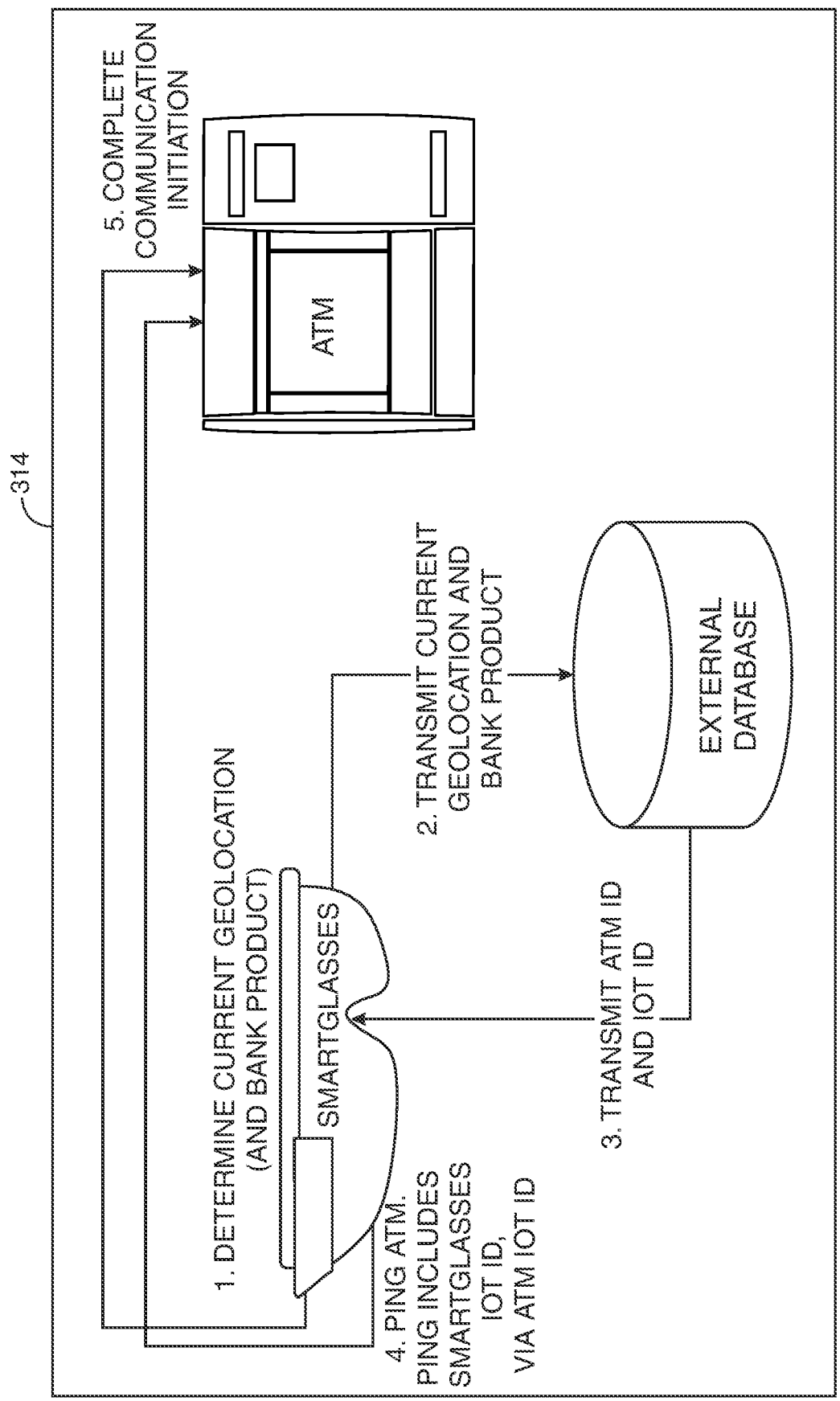

FIGS. 3A and 3B show illustrative diagrams. User 304 may be wearing smartglasses 306. Smartglasses 306 may be integrated with financial institution 302. Integration of a pair of smartglasses with a financial institution may include preregistering the smartglasses with the financial institution.

User 304 may approach ATM 310. When smartglasses 306 enters within a predetermined distance around ATM 310, smartglasses may discover ATM 310.

Smartglasses 306 may initiate a communication between smartglasses 306 and ATM 310, as shown at 314. The details of the communication are shown on FIG. 3B.

Step 1, included in FIG. 3B, shows the smartglasses determining current geolocation and entity product associated with the ATM. The identification of the geographic location of the ATM may be executed via a location search on the smartglasses. The location search may utilize global positioning system ("GPS") signals to identify the location of ATM. The location search may utilize a street address to identify the location of ATM. The entity product, also referred to herein as the financial institution entity, may be identified by scanning or photographing a symbol located on the ATM.

Step 2, included in FIG. 3B, shows the smartglasses transmitting the current geolocation and the entity product to an external database. The transmission from the smartglasses to the external database may include a request for an ATM identifier. The ATM identifier may include a unique ATM internet of things ("IOT") identifier.

It should be appreciated that, in some embodiments, the smartglasses may communicate with an external database to retrieve entity product information. In such embodiments, the smartglasses may transmit the geographic location information to an external database. The external database may determine, based on the geographic location information, entity product information. The external database may be the same external database used to retrieve an ATM identifier, as described above. The external database may be a separate external database from the external database used to retrieve the ATM identifier.

Step 3, included in FIG. 3B, shows the external database may transmit an ATM identifier and the ATM IOT identifier to the smartglasses. As described above, the ATM IOT identifier may be included in the ATM identifier.

Step 4, included in FIG. 3B, shows that once the ATM IOT identifier is received at the smartglasses, the smartglasses may ping the ATM. The ping may be directed to the ATM IOT identifier. The ping may include the smartglasses IOT identifier. The ping, also referred to herein as a transmission or a communication, may be via a wireless network, such as Bluetooth® or Beacon®. The transmission may be executed because the two parties of the transmission—i.e., the smartglasses and the ATM—may identify the IOT identifier associated with the other party.

Step 5, included in FIG. 3B, shows a completion of communication initiation. Once a communication has been established between the smartglasses and the ATM, information may be shared between the smartglasses and the ATM.

Once the communication has been established between smartglasses 306 and ATM 310, smartglasses 306 may authenticate the current wearer. For example, smartglasses 306 may include various authentication procedures to ensure that the wearer of smartglasses 306 is who he purports to be. Such authentication procedures may request user entry of a series of hand gestures, as shown at 312. Such authentication procedures may identify biometric characteristics and/or behavioral characteristics of the wearer. For example, the biometric characteristics and/or behavioral characteristics of the wearer may be monitored during wearing of smartglasses. Such characteristics may include gait, speed, voice detection, head movements and body movements. The authentication procedures may also include communication with another device, such as a mobile device. For example, smartglasses 306 may be authenticated when, within a predetermined distance, or paired, to a predetermined mobile device.

Once authenticated or in tandem with the authentication information transmission, smartglasses 306 may transmit account information to ATM 310. The account information may include one or more account credentials, such as an account number, account token, routing number, name of a person associated with the account and any other suitable account credentials. It should be appreciated that the information passed between smartglasses 306 and ATM 310 may be transmitted in a double encrypted format, as shown at 324.

In response to receipt of account credentials, ATM 310 may open a session with smartglasses 306. The session may enable user 304 to perform banking functions via ATM 310. The banking functions may include transfer of funds between accounts, withdrawal of funds, deposit of funds, retrieval of account balance information and other suitable banking functions.

Upon opening of a session, ATM 310 may display a GUI on the physical display included on ATM 310. The GUI displayed on the ATM may include various options, such as selectable buttons and text and numeric entry fields. In addition, a GUI may be transmitted to smartglasses 306. The GUI transmitted to smartglasses 306 may include the same or similar options displayed on ATM 310. However, the smartglasses GUI and ATM GUI may be executing on different operating system. Therefore, even though the smartglasses GUI and the ATM GUI may appear to be the same or similar, the underlying software code controlling the GUIs may be different. Another differentiating factor between the smartglasses GUI and the ATM GUI may include the user selectable options—e.g., the ATM user selectable options utilize touch-based buttons, and the smartglasses user selectable options utilize hand gestures.

Once the GUI is received at smartglasses 306, smartglasses 306 may display the GUI. The user's view of the GUI displayed on smartglasses 306 may be shown at 308. Once the GUI is displayed on smartglasses 306, user 304 may select one or more options. The options may be selected via hand gestures. The hand gesture-based selections may be received at a received included in smartglasses 306. Smartglasses 306 may translate the received hand gestures into commands that are consumable by ATM 310. The commands may be shared with the ATM 310 in double encrypted format.

ATM 310 may process, and execute, the commands received from smartglasses 306. Upon completion of processing and execution of the received commands, ATM 310 may transmit a communication to smartglasses 306 to ensure that all commands have been processed. Upon receipt of a command completion communication from smartglasses 306, ATM 310 may terminate the communication session. In some embodiments, smartglasses 306 may initiate the termination of the communication session.

Figure 4:
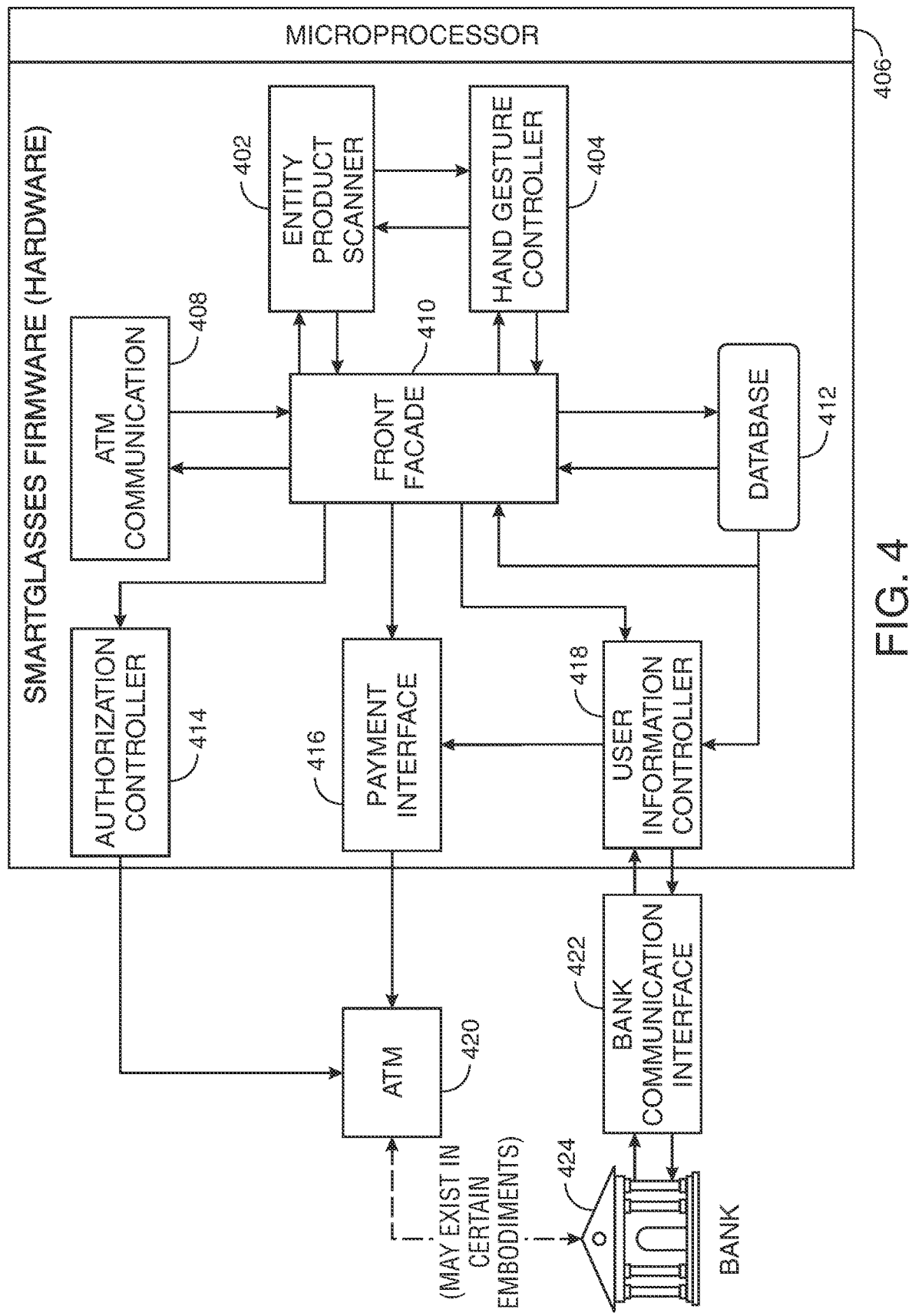
FIG. 4 shows an illustrative flow diagram in accordance with principles of the disclosure.

FIG. 4 shows an illustrative flow chart. The illustrative flow chart shows various components of an illustrative pair of smartglasses communicating with ATM 420. The components of the smartglasses may be software components, hardware components or a combination of software and hardware components. The smartglasses components may include authorization controller 414, ATM communication module 408, payment interface 416, front façade 410, entity product scanner 402, hand gesture controller 404, user information controller 418, database 412 and microprocessor 406. Bank 424 may be a financial institution that operates ATM 420. Bank communication interface 422 may be a software/hardware module that is operated by bank 424.

Front façade 410 may be the front façade of the smartglasses. Front façade 410 may communicate with ATM 420 using payment interface 416. Payment interface 416 may be received from ATM 420 during an authenticated session between ATM 420 and the smartglasses. Payment interface 416 may include screen controls. Payment interface 416 may be displayable on a smartglasses operating system. In addition to payment interface 416 being displayed on the smartglasses, a payment interface may also be displayed on ATM 420. It should be noted that the ATM payment interface may be operable to execute on a different operating system than the smartglasses operating system. Because the ATM payment interface and the smartglasses payment interface are executed on two different operating systems, the ATM payment interface and the smartglasses payment interface 416 may receive user inputs and user selections using different processes. It should be appreciated that, even though the ATM payment interface and the smartglasses payment interface are executed on two different operating systems, the ATM payment interface may appear similar to, or identical to, the smartglasses payment interface.

Front façade 410 may also communicate with an authorization controller 414. Authorization controller 414 may communicate with ATM 420. Authorization controller 414 may communicate with Bank 424, via ATM 420, to authenticate the wearer of the smartglasses.

Front façade 410 may also communicate with an entity product scanner. The entity product scanner may scan ATM 420 and determine with which entity or financial institution the ATM 420 is associated.

Front façade 410 may also communicate with hand gesture controller 404. Front façade 410 may transmit hand gesture-based command data to hand gesture controller 404. The hand gesture-based command data include a list of hand gestures and the interpretation for each hand gesture. For example, a swipe may be interpreted as a move from a first selection option to a second selection option. A double tap may be interpreted as a selection. Hand gesture controller 404 may read the hand gestures-based commands presented to front façade 410. Hand gesture controller 404 may receive data from entity product scanner 402.

ATM communication module 408 may interface with front façade 410. ATM communication module 408 may include functions for communication between front façade 410 and ATM 420. As such, ATM communication module 408 may be imported into a memory, associated with the smartglasses, to facilitate the communication between the smartglasses and the ATM.

Front façade 410 may communicate with authorization controller 414. The communication between front façade 410 and authorization controller 414 may authenticate the communication between ATM 420 and the smartglasses. Authorization controller 414 may include multiple authentication methods to authenticate the smartglasses. In some embodiments, authorization controller 414 may authenticate the user by communicating with a financial institution associated with ATM 420, such as bank 424. The authentication communications between bank 424 and ATM 420 may include transmission of an account number, personal identification number, encrypted biometric information or any other suitable authentication information.

Upon a successful authentication of the smartglasses, data relating to the successful authentication communication may be stored in database 412. Front façade 410 may communicate a database 412. Database 412 may be located within the smartglasses. Database 412 may also include stored information relating to communications between the smartglasses and an ATM. For example, the stored information may include entity information relating to the financial institution, user's bank account information and user's authentication information. The stored information may be saved for future communications between an ATM and the smartglasses.

Microprocessor 406 may power the various components of the smartglasses, such as front façade 410, database 412, entity product scanner 402, hand gesture controller 404, ATM communication module 408, authorization controller 414, payment interface 416 and user information controller 418. Microprocessor 406 may be linked to a memory and a battery.

Front façade 410 may also communicate with user information controller 418. User information controller 418 may retrieve bank account information from the user. In some embodiments, user information controller 418 may communicate directly with the user to receive entry of an account number, or any other suitable data. Communications between user information controller 418 and the user may include audio-based communications. As such, user information controller 418 may be associated with one or more speakers, audio receptors and voice recognition modules. In some embodiments, user information controller 418 may communicate with an external device, such as a paired mobile device, to retrieve bank account information. Bank communication interface 422 may establish communication between user information controller 418 and bank 424. Bank 424 may be the financial institution that operates ATM 420.

Thus, a smartglasses-based contactless ATM transaction processing is provided. Persons skilled in the art will appreciate that the present invention can be practiced by other than the described embodiments, which are presented for purposes of illustration rather than of limitation. The present invention is limited only by the claims that follow.

What is claimed is:

1. A system for establishing and maintaining touchless communication between a smartglasses operating system and an automated teller machine ("ATM"), the system comprising:
   a smartglasses application, said smartglasses application operable to:
     scan a predetermined vicinity for an ATM;
     upon locating the ATM, capture:
       a current geographic location of the ATM; and
       an entity product associated with the ATM;
     transmit the captured current geographic location and the captured entity product to an external database;
     receive an ATM internet of things ("IOT") identifier from the external database;
     ping the ATM using the ATM IOT identifier, the ping comprising a smartglasses IOT identifier;
     receive, from the ATM, a request to authenticate a user of the smartglasses;
     authenticate, at an authorization controller included in the smartglasses, the user of the smartglasses;
     upon successful authentication of the user at the smartglasses, transmit a responsive authentication communication to the ATM;
     receive, via touchless communication, a smartglasses operating system-based interactive payment interface from the ATM;
     display the smartglasses operating system-based interactive payment interface on a display included in the smartglasses;
     receive at least one hand gesture-based command;
     translate the at least one hand gesture-based command into an ATM-readable command;
     transmit the ATM-readable command to the ATM;
     receive a response to the ATM-readable command from the ATM; and
     display the received response on the display included in the smartglasses.

2. The system of claim 1, wherein the smartglasses application is operable to scan the predetermined vicinity when the smartglasses application is set to a discoverable mode.

3. The system of claim 1, wherein the authorization controller authenticates the user based on a group of detected user behavioral characteristics.

4. The system of claim 3, wherein the group of detected user behavioral characteristics include gait, speed, voice detection, head movements and body movements.

5. The system of claim 1, wherein the ATM authenticates the user by:
   transmitting the received responsive authentication communication to an external authenticator; and
   receiving an authenticated signal from the external authenticator.

6. The system of claim 1, wherein the ATM is operable to display an ATM operating system-based interactive payment interface on an ATM display, said ATM operating system-based interactive payment interface that replicates the smartglasses operating system-based interactive payment interface on the ATM display.

7. The system of claim 6, wherein the ATM operating system-based interactive payment interface and the smartglasses operating system-based interactive payment interface appear to the user to be identical.

8. The system of claim 7, wherein:
the ATM operating system-based interactive payment interface accepts touch inputs; and
the smartglasses operating system-based interactive payment interface accepts hand gesture inputs.

9. A system for establishing and maintaining touchless communication between a smartglasses operating system and an automated teller machine ("ATM") operating system, the system comprising:
an ATM application executing on an ATM; and
a smartglasses application executing on a smartglasses, said smartglasses application comprising:
an entity product scanner, said entity product scanner operable to identify an entity associated with the ATM;
an ATM communication module, said ATM communication module operable to communicate with the ATM application, said communication between the ATM communication module and the ATM application being based on the entity identified by the entity product scanner;
a user information controller, said user information controller operable to:
interface with an external database associated with the ATM; and
maintain user account data in a smartglasses-based database;
an authorization controller, said authorization controller operable to:
authenticate a user of the smartglasses;
transmit authentication data to the ATM application; and
receive an authorization response from the ATM application;
a hand gesture controller, said hand gesture controller operable to receive hand gesture-based commands from the user of the smartglasses;
an interactive payment interface, said interactive payment interface displayable on a display of the smartglasses, said interactive payment interface operable to receive user selections via the hand gesture controller; and
a front façade module, said front façade module operable to interface between the entity product scanner, the ATM communication module, the user information controller, the authorization controller, the hand gesture controller and the interactive payment interface
wherein:
the interactive payment interface is a smartglasses operating system-based interactive payment interface;
the ATM application displays an ATM operating system-based interactive payment interface on a display of the ATM;
the ATM operating system-based interactive payment interface accepts touch input and
the smartglasses operating system-based interactive payment interface accepts hand gesture-based input.

10. The system of claim 9 wherein the ATM operating system-based interactive payment interface and the smartglasses operating system-based interactive payment interface displayed on the smartglasses application are identical.

* * * * *